United States Patent
Nishio

(10) Patent No.: US 8,214,322 B2
(45) Date of Patent: Jul. 3, 2012

(54) INFORMATION PROCESSING APPARATUS, METHOD OF CONTROLLING INFORMATION PROCESSING APPARATUS, COMPUTER PROGRAM, AND COMPUTER READABLE STORAGE MEDIUM

(75) Inventor: Masahiro Nishio, Higashiyamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 11/917,087

(22) PCT Filed: Aug. 29, 2006

(86) PCT No.: PCT/JP2006/317397
§ 371 (c)(1),
(2), (4) Date: Dec. 10, 2007

(87) PCT Pub. No.: WO2007/026908
PCT Pub. Date: Mar. 8, 2007

(65) Prior Publication Data
US 2010/0061268 A1   Mar. 11, 2010

(30) Foreign Application Priority Data

Aug. 31, 2005  (JP) .................................. 2005-252472

(51) Int. Cl.
*G06F 7/00* (2006.01)
(52) U.S. Cl. .......................... 707/602; 370/254; 709/220
(58) Field of Classification Search .................. 717/176; 707/709, 603; 382/195
See application file for complete search history.

(56) References Cited

U.S. PATENT DOCUMENTS

| | | | | |
|---|---|---|---|---|
| 6,941,356 | B2 * | 9/2005 | Meyerson | 709/220 |
| 7,925,729 | B2 * | 4/2011 | Bush et al. | 709/223 |
| 2003/0212824 | A1 * | 11/2003 | Yoshizawa et al. | 709/245 |
| 2003/0221122 | A1 * | 11/2003 | Hatori | 713/200 |
| 2004/0003112 | A1 | 1/2004 | Alles et al. | 709/237 |
| 2004/0249907 | A1 * | 12/2004 | Brubacher et al. | 709/220 |
| 2005/0108369 | A1 * | 5/2005 | Sather et al. | 709/220 |

FOREIGN PATENT DOCUMENTS

EP   1528751 A2   5/2005
JP   2001-117834   4/2001

(Continued)

OTHER PUBLICATIONS

Dec. 12, 2006 International Search Report in PCT/JP2006/317397.

(Continued)

*Primary Examiner* — Don Wong
*Assistant Examiner* — Mohammad Kabir
(74) *Attorney, Agent, or Firm* — Fitzpatrick, Cella, Harper & Scinto

(57) ABSTRACT

According to this invention, whether to automatically install the device driver of a discovered network device can be set in accordance with the network configuration of a connected network. A client terminal stores, for each network, network configuration information capable of specifying a network, and mode setting information describing whether or not to install the device driver of a network UPnP device upon connection to the network. When the client terminal is connected to a given network, a Plug and Play mode setting utility reads out mode setting information which matches the connected network configuration. In accordance with the setting information, the Plug and Play mode setting utility switches whether or not to send a message to the OS upon reception of a Hello message, or whether or not to transmit a Probe message requested by the OS onto the network.

8 Claims, 21 Drawing Sheets

FOREIGN PATENT DOCUMENTS

| | | |
|---|---|---|
| JP | 2003-316650 | 11/2003 |
| JP | 2003-323363 | 11/2003 |
| JP | 2004-038956 | 2/2004 |
| JP | 2004-362594 | 12/2004 |
| JP | 2005-135414 | 5/2005 |

OTHER PUBLICATIONS

Jan. 8, 2008 International Preliminary Report on Patentability in PCT/JP2006/317397.

* cited by examiner

FIG. 3

```
<PnPModeData>

<NetConfiguration>
        <DHCPEnabled>YES|NO</DHCPEnabled>
        <IPAddress>xxx.xxx.xxx.xxx</IPAddress>
        <SubnetMask>xxx.xxx.xxx.xxx</SubnetMask>
        <Gateway>xxx.xxx.xxx.xxx</Gateway>
        <DNSServer>xxx.xxx.xxx.xxx</DNSServer>
        <DHCPServer>xxx.xxx.xxx.xxx</DHCPServer>
    </NetConfiguration>
    <PnPSetting>
        <Probe>YES|NO</Probe>
        <Hello>YES|NO</Hello>
    </PnPSetting>
</PnPModeData>
```

FIG. 4

TERMINAL CONNECTS TO Ethernet AT PRESENT.

◎ SEARCH FOR NETWORK DEVICE: PERMIT

◎ RESPONSE TO Hello MESSAGE: INHIBIT

DO YOU CHANGE SETTINGS?

| Yes | No |

FIG. 5

TERMINAL CONNECTS TO Ethernet AT PRESENT.

◎ SEARCH FOR NETWORK DEVICE

| PERMIT | ▼ |
| INHIBIT | |

◎ RESPONSE TO Hello MESSAGE

| INHIBIT | ▼ |

OK   Cancel

FIG. 8

```
<s:Envelope ... >
  <s:Header ... >
    <a:Action ... >
        http://schemas. xmlsoap.org/ws/2005/04/discovery/Hello
    </a:Action>
    <a:MessageID ... >xs:anyURI</a:MessageID>
    [<a:RelatesTo RelationshipType="d:Suppression" >
        xs:anyURI
    </a:RelatesTo>]?
    <a:To ... >urn:schemas-xmlsoap-org:ws:2005:04:discovery</a:To>
    <d:AppSequence ... />
    ...
  </s:Header>
  <s:Body ... >
    <d:Hello ... >
      <a:EndpointReference> ... </a:EndpointReference>
      [<d:Types>list of xs:QName</d:Types>]?
      [<d:Scopes>list of xs:anyURI</d:Scopes>]?
      [<d:XAddrs>list of xs:anyURI</d:XAddrs>]?
      <d:MetadataVersion>xs:unsignedInt</d:MetadataVersion>
      ...
    </d:Hello>
  </s:Body>
</s:Envelope>
```

FIG. 9

```
<s12:Envelope
    xmlns:s12=' http://www.w3.org/2003/05/soap-envelope'
    xmlns:wsa=' http://schemas. xmlsoap.org/ws/2004/08/addressing'
    xmlns:wsp=' http://schemas. xmlsoap.org/ws/2004/09/policy'
  <s12:Header>
    <wsa:Action>
      http://schemas. xmlsoap.org/ws/2004/09/mex/GetMetadata/Request
    </wsa:Action>
    <wsa:MessageID>
        uuid:73d7edfc-5c3c-49b9-ba46-2480caee43e9
    </wsa:MessageID>
    <wsa:ReplyTo>
      <wsa:Address>http://client.example.com/MyEndpoint</wsa:Address>
    </wsa:ReplyTo>
    <wsa:To>http://server.example.org/YourEndpoint</wsa:To>
    <ex:MyRefProp xmlns:ex=' http://server.example.org/refs' >
        78f2dc229597b529b81c4bef76453c96
    </ex:MyRefProp>
  </s12:Header>
  <s12:Body>
    <wsx:GetMetadata>
      <wsx:Dialect>
          http://aaa.bbb.com/printer/DeviceData
      </wsx:Dialect>
    </wsx:GetMetadata>
  </s12:Body>
</s12:Envelope>
```

FIG. 10

```
<s12:Envelope
    xmlns:s12=' http://www.w3.org/2003/05/soap-envelope'
    xmlns:wsa=' http://schemas. xmlsoap.org/ws/2004/08/addressing'
    xmlns:wsp=' http://schemas. xmlsoap.org/ws/2004/09/policy'
    xmlns:wsx=' http://schemas. xmlsoap.org/ws/2004/09/mex' >
  <s12:Header>
    <wsa:Action>
      http://schemas. xmlsoap.org/ws/2004/09/mex/GetMetadata/Response
    </wsa:Action>
    <wsa:RelatesTo>
        uuid:73d7edfc-5c3c-49b9-ba46-2480caee43e9
    </wsa:RelatesTo>
    <wsa:To>http://client.example.com/MyEndpoint</wsa:To>
  </s12:Header>
  <s12:Body>
    <wsx:Metadata>
      <wsx:MetadataSection Dialect=' http://aaa.bbb.com/printer/DeviceData>
        <DeviceData>
            <Manufacturer>xxx company</Manufacturer>
            <ModelName>NetworkPrinter123</ModelName>
        </DeviceID>

</wsx:MetadataSection>
    </wsx:Metadata>
  </s12:Body>
</s12:Envelope>
```

FIG. 12

```
<s:Envelope
    xmlns:a ="http://schemas.xmlsoap.org/ws/2004/08/addressing"
    xmlns:d ="http://schemas.xmlsoap.org/ws/2005/04/discovery"
    xmlns:i ="http://printer.example.org/ws/2003/imaging"
    xmlns:s ="http://www.w3.org/2003/05/soap-envelope" >
  <s:Header>
    <a:Action>
      http://schemas.xmlsoap.org/ws/2005/04/discovery/Probe
    </a:Action>
    <a:MessageID>
      uuid:0a6dc791-2be6-4991-9af1-454778a1917a
    </a:MessageID>
    <a:To>urn:schemas-xmlsoap-org:ws:2005:04:discovery</a:To>
  </s:Header>
  <s:Body>
    <d:Probe>
      <d:Types>i:PrintBasic</d:Types>
      <d:Scopes
  MatchBy="http://schemas.xmlsoap.org/ws/2005/04/discovery/ldap" >
        ldap:///ou=engineering,o=examplecom,c=us
      </d:Scopes>
    </d:Probe>
  </s:Body>
</s:Envelope>
```

FIG. 13

```
<s:Envelope
    xmlns:a ="http://schemas.xmlsoap.org/ws/2004/08/addressing"
    xmlns:d ="http://schemas.xmlsoap.org/ws/2005/04/discovery"
    xmlns:i ="http://printer.example.org/ws/2003/imaging"
    xmlns:s ="http://www.w3.org/2003/05/soap-envelope">
    <s:Header>
        <a:Action>
            http://schemas.xmlsoap.org/ws/2005/04/discovery/ProbeMatches
        </a:Action>
        <a:MessageID>
            uuid:e32e6863-ea5e-4ee4-997e-69539d1ff2cc
        </a:MessageID>
        <a:RelatesTo>
            uuid:0a6dc791-2be6-4991-9af1-454778a1917a
        </a:RelatesTo>
        <a:To>
        http://schemas.xmlsoap.org/ws/2004/08/addressing/role/anonymous
        </a:To>
        <d:AppSequence InstanceId="1077004800" MessageNumber="2"/>
    </s:Header>

<s:Body>
        <d:ProbeMatches>
            <d:ProbeMatch>
                <a:EndpointReference>
                    <a:Address>
                        uuid:98190dc2-0890-4ef8-ac9a-5940995e6119
                    </a:Address>
                </a:EndpointReference>
                <d:Types>i:PrintBasic i:PrintAdvanced</d:Types>
                <d:Scopes>
                    ldap:///ou=engineering,o=examplecom,c=us
                    ldap:///ou=floor1,ou=b42,ou=anytown,o=examplecom,c=us
                    http://itdept/imaging/deployment/2004-12-04
                </d:Scopes>
                <d:XAddrs>http://prn-example/PRN42/b42-1668-a</d:XAddrs>
                <d:MetadataVersion>75965</d:MetadataVersion>
            </d:ProbeMatch>
        </d:ProbeMatches>
    </s:Body>
</s:Envelope>
```

FIG. 15

- ◎ PLEASE SELECT NETWORK.
  - Wi-Fi ▼
- ◎ SEARCH FOR NETWORK DEVICE
  - PERMIT ▼
  - INHIBIT
- ◎ RESPONSE TO Hello MESSAGE
  - INHIBIT ▼

[ OK ]  [ Cancel ]

FIG. 16

```
<PnPModeData>

<NetworkType>Ethernet|Wi-Fi|Bluetooth</NetworkType>
    <PnPSetting>
        <Probr>YES|NO</Probe>
        <Hello>YES|NO</Hello>
    </PnPSetting>
</PnPModeData>
```

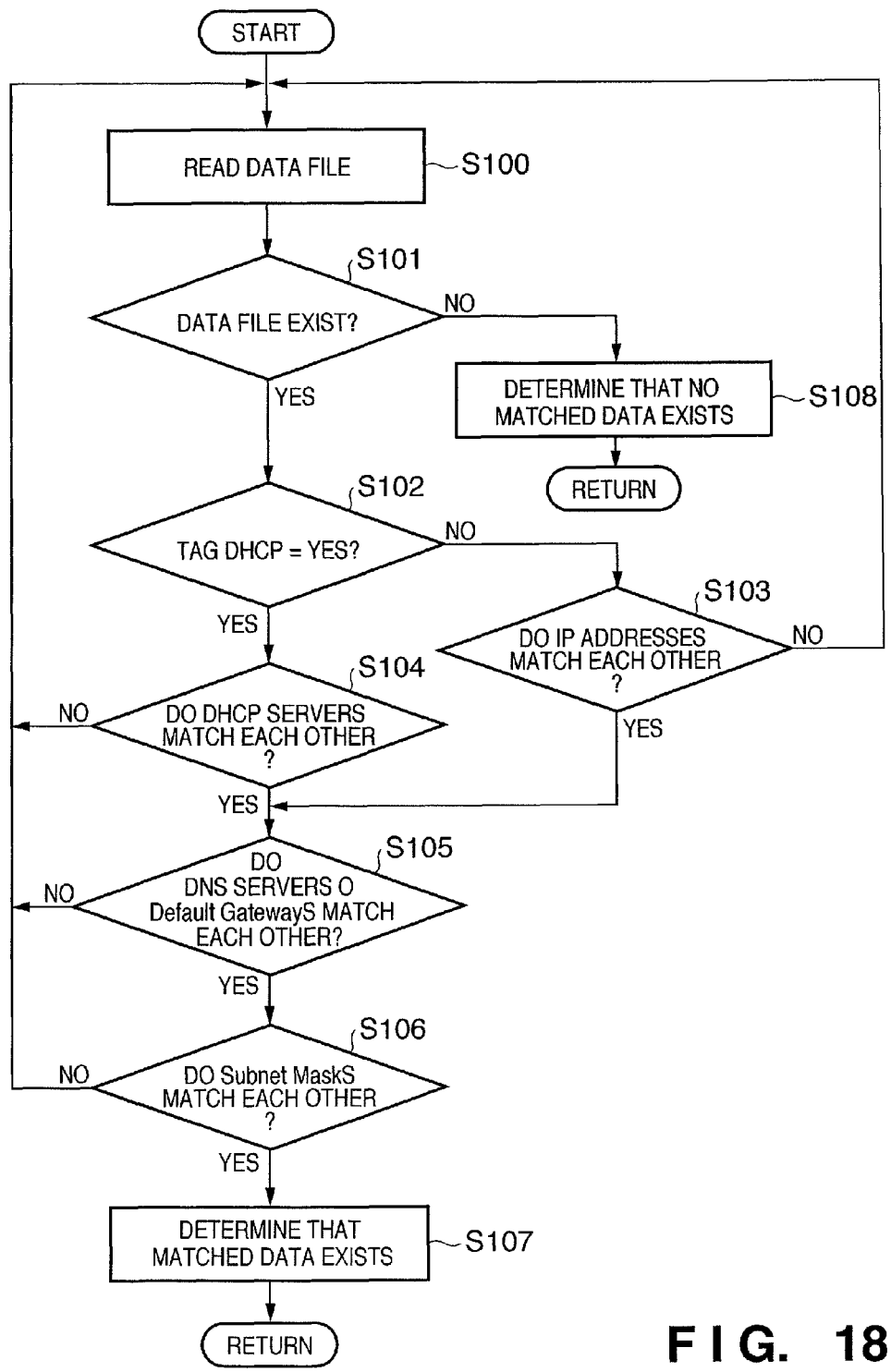
F I G. 18

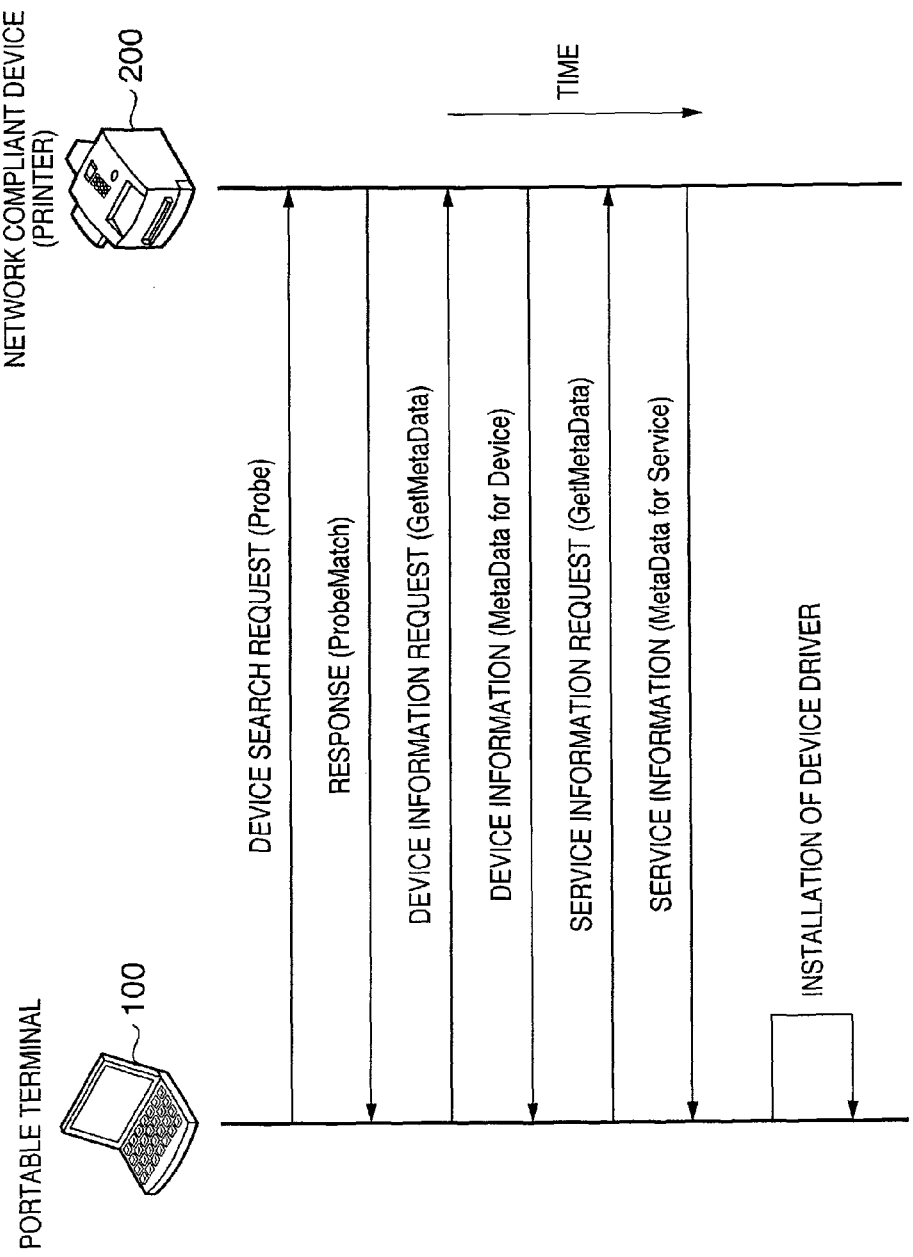

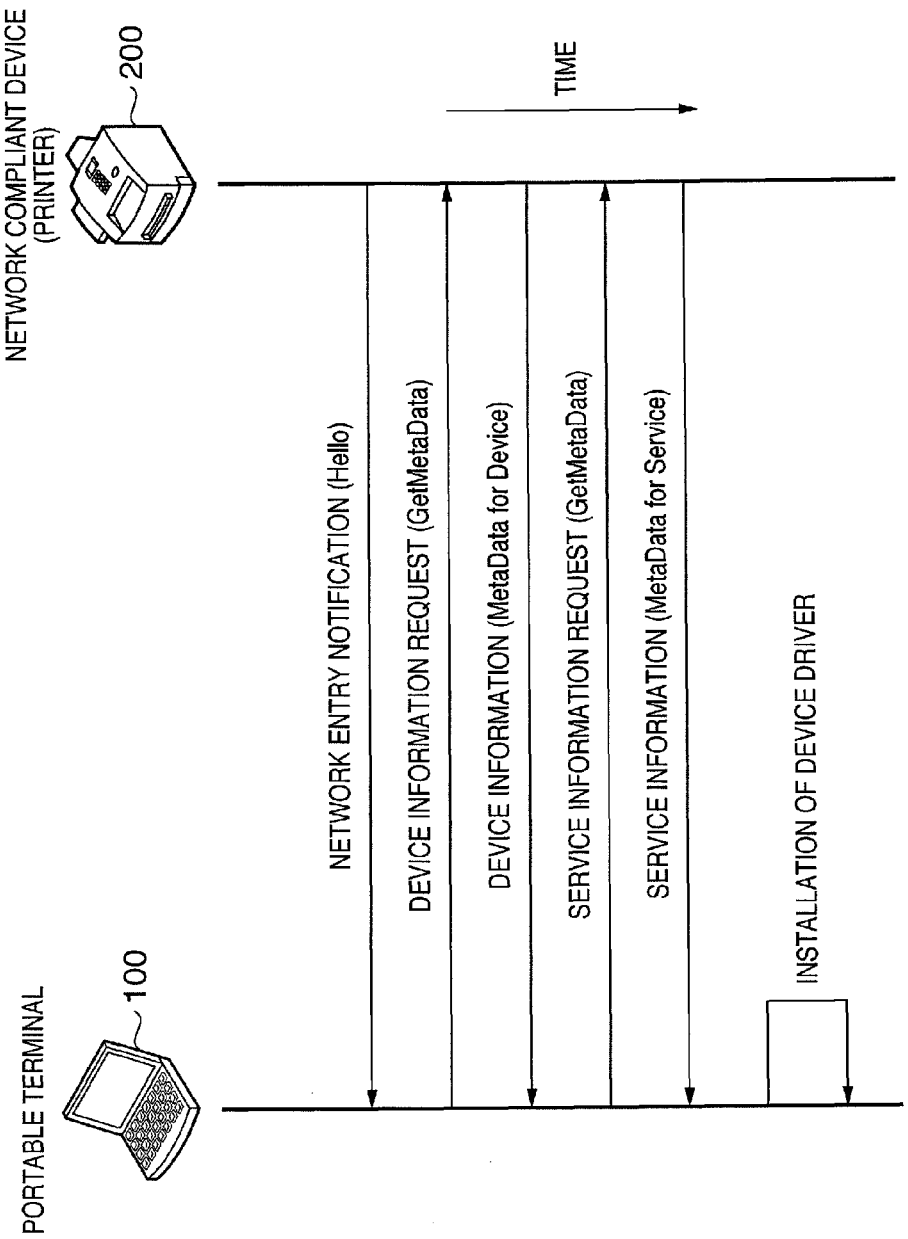

FIG. 20

| DHCP | Yes | No | Yes |
|---|---|---|---|
| IP Address | ... | 192.168.3.220 | ... |
| SubnetMask | 255.255.255.0 | 255.255.255.0 | 255.255.0.0 |
| Gateway | 192.168.1.150 | 192.168.3.150 | 192.168.220.150 |
| DNSServer | 192.168.1.200 | 192.168.3.200 | 192.168.230.200 |
| DHCPServer | 192.168.1.220 | ... | 192.168.240.220 |
| Probe | Yes | No | No |
| Hello | Yes | Yes | No |

INFORMATION PROCESSING APPARATUS, METHOD OF CONTROLLING INFORMATION PROCESSING APPARATUS, COMPUTER PROGRAM, AND COMPUTER READABLE STORAGE MEDIUM

TECHNICAL FIELD

The present invention relates to a technique of installing a device driver for controlling a network compliant peripheral device.

BACKGROUND ART

There have conventionally been known a service providing apparatus and service providing system which meet a service request from a client apparatus on a network. Along with rapid spread of Internet communication, devices of various types have been developed as network compliant devices in addition to a conventional personal computer. Examples of these devices are user interactive devices (e.g., a PDA (Personal Digital Assistance) and cell phone), and image processing apparatuses (e.g., a scanner, printer, copying machine, and digital camera). Even home appliances such as a TV set, air conditioner, and refrigerator comply with a network.

With the advance of network compliant devices, a technique of searching for a network device which provides a service has been developed. There is proposed a technique, protocol, and architecture which automatically set up application software, utility software, an operating system, and the like for controlling a network compliant device (e.g., Japanese Patent Laid-Open Nos. 2004-038956 and 2004-362594).

Companies and standardization groups have proceeded establishment of specifications in order to expand Plug and Play technologies (PnP), which has been applied to a local I/O connection device, so as to cope with a network device.

For example, UPnP and WSD (Web Services for Devices) have been developed mainly by Microsoft, USA. Other examples of PnP are BMLinkS promoted by Japan Business Machine and Information System Industries Association (JB-MIA), and Rendezvous supported by OS X developed by Apple, USA.

It is expected to improve convenience as the network PnP prevails.

However, an adverse effect by a network PnP device is predicted in the use of a mobile device (e.g., a notebook PC, PDA, or cell phone) which is always moved between different network configurations. This is because an unwanted network device against the user's will is detected in using a mobile device, and the driver and application of the detected network device may be installed in the mobile device.

This adverse effect can be easily understood by considering a case where, for example, a notebook personal computer is moved from home or an office at the place of employment and used in a different network configuration such as an office at the visit or at a hot spot in a public facility. In this case, even if the user himself does not intend to use a network device, the PnP function of the notebook personal computer may discover a network device running in the network configuration. In other words, the driver and application of an unwanted network device may be automatically installed.

As a result, the hardware resource, especially, memory resource of a mobile device is uselessly wasted. Software which is not reliable in security may be installed while the user is not aware of it. This may lead to a serious damage such as destruction or leakage of information.

Every time the PnP function of a mobile device such as a notebook PC, PDA, or cell phone discovers a network device, a pop-up message which promotes installation, a warning message, or the like is displayed. When a network contains several ten or several hundred of network devices, the user of the mobile device must deal with procedures and work to cancel these messages.

DISCLOSURE OF INVENTION

The present invention has been made to overcome the conventional drawbacks, and has as its object to provide a technique capable of setting whether to automatically install the device driver of a discovered network device in accordance with the network configuration of a connected network.

In order to solve the above problems, for example, an information processing apparatus according to the present invention comprises the following configuration.

That is, an information processing apparatus which can have network communication means, and detects a network device via the network communication means to automatically install a corresponding device driver in an OS comprises setting means for setting, for each network configuration information for specifying a network to be connected, whether or not to automatically install the device driver in a network configuration, and storing and holding setting information, determination means for determining, while the network communication means connects to a network, which of network configurations set by the setting means corresponds to the connected network, and control means for controlling, in accordance with setting information based on the network configuration determined by the determination means, to switch whether or not to automatically install a device driver corresponding to a network device on the connected network.

A method of controlling an information processing apparatus according to the present invention comprises the following configuration. That is, a method of controlling an information processing apparatus which can have network communication means, and detects a network device via the network communication means to automatically install a corresponding device driver in an OS, the method comprises the steps of setting, for each network configuration information for specifying a network to be connected, whether or not to automatically install the device driver in a network configuration, and storing and holding setting information, determining, while the network communication means connects to a network, which of network configurations set in the step of setting corresponds to the connected network, and controlling, in accordance with setting information based on the network configuration determined in the step of determination, to switch whether or not to automatically install a device driver corresponding to a network device on the connected network.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 3 is a view showing the format of PnP setting data in the embodiment;

FIG. 4 is a view showing an example of a pop-up menu representing PnP mode setting information in the embodiment;

FIG. 5 is a view showing an example of a pop-up menu for setting a PnP play mode in the embodiment;

FIG. 8 is a view showing the format of a Hello message defined by WS-Discovery specifications;

FIG. 9 is a view showing the format of a GetMetadata message defined by WS-MetadataExchange specifications;

FIG. 10 is a view showing the format of a GetMetadataResponse message defined by the WS-MetadataExchange specifications;

FIG. 12 is a view showing the format of a Probe message defined by the WS-Discovery specifications;

FIG. 13 is a view showing the format of a Probe Match message defined by the WS-Discovery specifications;

FIG. 15 is a view showing the user interface of a PnP mode setting utility in the second embodiment;

FIG. 16 is a view showing the format of PnP setting data in the second embodiment;

FIG. 18 is a flowchart showing comparison process procedures for a network configuration in the first embodiment;

FIGS. 19A and 19B are charts showing a general sequence from discovery of a UPnP network device up to installation of its device driver; and FIG. 20 is a table showing a data format when PnP setting data is held in the table format in the first embodiment.

BEST MODE FOR CARRYING OUT THE INVENTION

Several embodiments according to the present invention will be described in detail below with reference to the accompanying drawings. Protocols, versions, addresses, numerical values, and the like in the following description are merely examples, and are not construed to limit the present invention to only them unless otherwise specified.

<First Embodiment>

Figure 1:
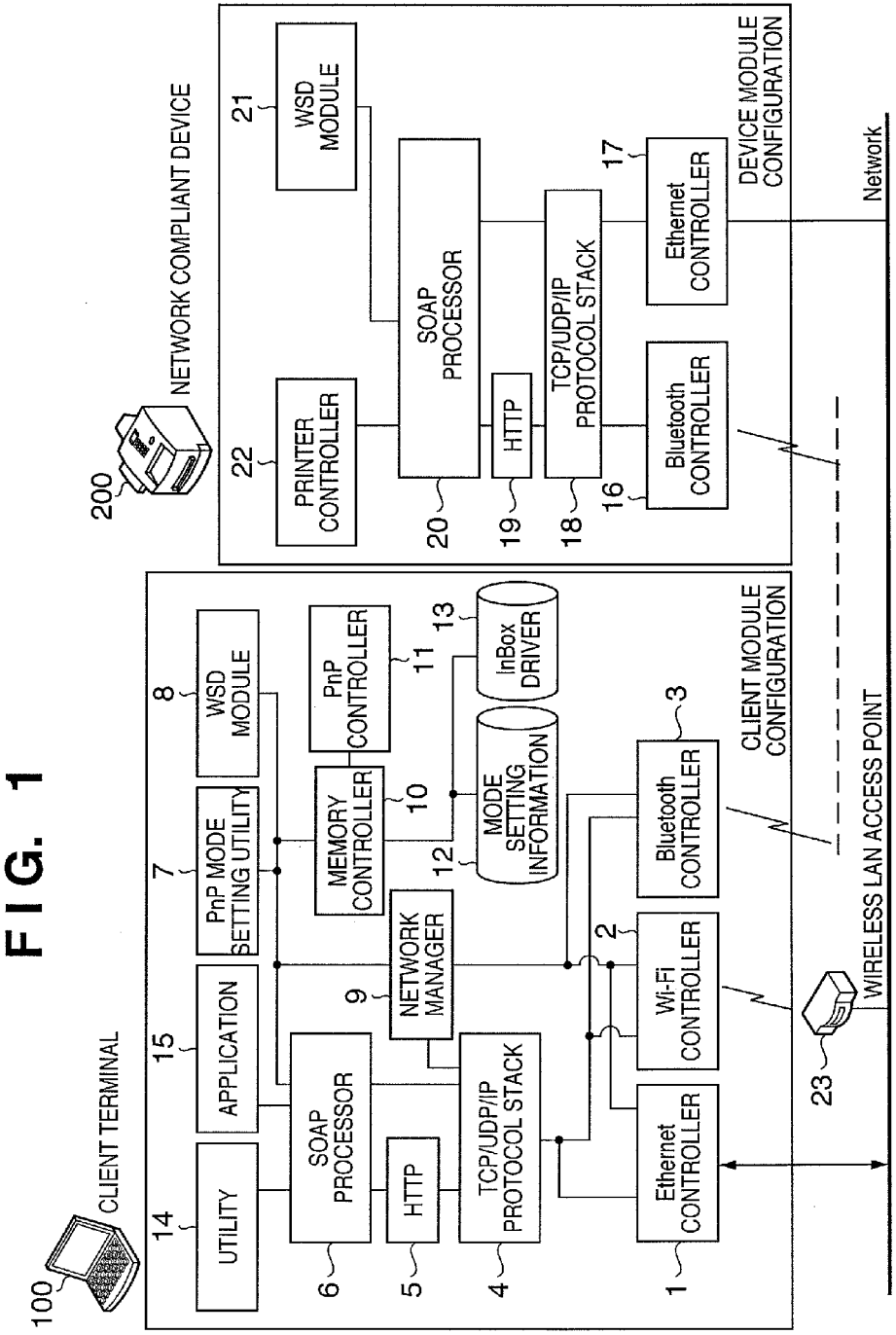
FIG. 1 is a block diagram showing the schematic configuration of a network Plug and Play (PnP) system in an embodiment.

FIG. 1 is a block diagram showing the configuration of a network Plug and Play system according to the first embodiment.

In FIG. 1, reference numeral 100 denotes a client terminal, e.g., a notebook PC for which the communication configuration may frequently change from an office to a home network or a network configuration at the visit. The client terminal 100 may also be a PDA, cell phone, or the like.

The client terminal 100 complies with Ethernet, Wi-Fi (IEEE80.11a/b/g), and Bluetooth as communication functions, and comprises an Ethernet controller 1, Wi-Fi controller 2, and Bluetooth controller 3. The client terminal 100 may mount their dedicated communication cards. The client terminal 100 comprises a TCP/UDP/IP protocol stack 4 on an upper layer above these controllers, and an HTTP 5 on the protocol stack. The HTTP 5 analyzes an HTTP request and responds to it.

The client terminal 100 comprises a SOAP (Simple Object Access Protocol) processor 6 on an upper layer above the TCP/UDP/IP protocol stack 4 and HTTP 5. A Plug and Play (PnP) mode setting utility 7, WSD module 8, utility 14, and application 15 implement bidirectional communication of data described in eXtensible Markup Language (XML) via the SOAP processor 6.

A network manager 9 is a module which manages the Ethernet controller 1, Wi-Fi controller 2, and Bluetooth controller 3, and has a function of acquiring setting information of each controller and information on a communication state.

The PnP mode setting utility 7 controls the network manager 9 to acquire information of a network controller in operation and its setting information. The PnP mode setting utility 7 has a function of recording the setting information in a memory (or a hard disk) via a memory controller 10.

The PnP mode setting utility 7 has a function of acquiring network configuration information from the TCP/UDP/IP protocol stack 4. The PnP mode setting utility 7 also has a function of recording setting information of the network configuration as mode setting information 12 in the memory (nonvolatile memory such as a hard disk) via the memory controller 10.

The PnP mode setting utility 7 controls a PnP setting UI to record the setting information in the memory via the memory controller 10.

These pieces of setting information are converted into XML (eXtensible Markup Language) by the PnP mode setting utility 7, and recorded on the memory in the XML format. Details of the setting information and the format will be described later.

The PnP mode setting utility 7 controls to enable/disable the Hello message receiving port of the TCP/UDP/IP protocol stack 4 in accordance with a recorded PnP mode.

The PnP mode setting utility 7 controls to enable/disable transmission of a Probe message by the SOAP processor 6 in accordance with a recorded PnP mode.

The WSD module 8 responds, via the SOAP processor 6, to a Hello message transmitted from a network device, on the basis of the WS-Discovery specifications, establishment of which has been progressed by Microsoft, USA and the like. The WSD module 8 issues, via the SOAP processor 6, a Probe message to search for a network device. The WSD module 8 acquires attribute information of a network device by issuing a GetMetadata message on the basis of WS-MetadataExchange specifications.

When a network device is discovered by these message processes, the WSD module 8 notifies a Plug and Play (PnP) controller 11 of attribute information of the discovered network device. The PnP controller 11 has a function of loading a corresponding driver and utility software from the memory via the memory controller 10 on the basis of the attribute information, and installing the driver and utility software in the client terminal 100.

The application is, e.g., a wordprocessor. Assume that the user instructs a printer serving as a network device to print a document edited by the application. In this case, information of the document is transmitted as job data and print data to a network compliant device 200 via a driver and utility installed by the PnP controller 11.

The network compliant device 200 (network compliant printer in the first embodiment) complies with Ethernet, Wi-Fi (IEEE80.11a/b/g), and Bluetooth as communication functions, and comprises an Ethernet controller 17 and Bluetooth controller 16. The network compliant device 200 comprises a TCP/UDP/IP protocol stack 18 on an upper layer above these controllers, and an HTTP 19 on the protocol stack. The HTTP 19 analyzes an HTTP request and responds to it.

The network compliant device 200 comprises a SOAP processor 20 on an upper layer above the TCP/UDP/IP protocol stack 18 and HTTP 19. A WSD module 21 and printer controller 22 implement bidirectional communication of data described in XML via the processor.

The WSD module 21 performs, via the SOAP processor 20, a process based on the WS-Discovery specifications, establishment of which has been pushed forward by Microsoft, USA and the like. More specifically, the WSD module 21 transmits a Hello message upon connection to a network, and responds to a Probe message issued from the client terminal 100.

The WSD module 21 sends back attribute information of the network compliant device (network compliant printer in this example) on the basis of the WS-MetadataExchange specifications in response to a GetMetadata message issued from the client terminal 100.

A wireless LAN access point 23 functions as a relay device for communication on a network. When the client terminal 100 connects to a network via the Wi-Fi controller 2, it connects to Ethernet via the wireless LAN access point 23.

Procedures to perform search based on WSD specifications between the client terminal 100 and the network compliant device 200 and install a device driver for the network compliant device 200 will be simply explained with reference to FIGS. 19A and 19B.

FIG. 19A shows procedures when the client terminal 100 is connected to a network or the user inputs an instruction to search for a network device.

The client terminal 100 multicasts (broadcasts) a Probe message serving as a device search request to a network. Upon reception of the Probe message, the network compliant device (network compliant printer in the first embodiment) 200 unicasts a response message (ProbeMatch) to the client terminal 100 in order to respond to the Probe message. After that, transmission and reception are executed by unicast because the client terminal 100 and network compliant device 200 recognize each other as communication partners.

Since the client terminal 100 receives the response message, it can detect the presence of the network compliant device 200 on the network. The client terminal 100 proceeds to the next stage to unicast a device information request message (GetMetaData) to the network compliant device and acquire device information (MetaData for Device). Then, the client terminal 100 transmits a service information request message (GetMetaData), and acquires service information (MetaData for Service).

As a result, the client terminal 100 can obtain the model name and attribute information (information representing that the network compliant device 200 is a printer) of the network compliant device 200. The client terminal 100 can install a corresponding device driver (in this case, a printer driver) in the OS (Operating System).

FIG. 19B shows procedures when the client terminal 100 permits the network compliant device 200 to enter the network upon completion of connection to the network. Note that it can be easily understood that the network compliant device 200 enters the network when the network compliant device 200 is turned on.

The network compliant device multicasts an entry message (Hello) for entering the network. Upon reception of the entry message, the client terminal 100 detects the presence of the network compliant device 200, and transmits a device information request message. Subsequent procedures are the same as those in FIG. 19A.

In this manner, the client terminal 100 detects an unknown network compliant device, and a corresponding device driver is automatically installed, reducing the burden on the user. However, if the client terminal 100 is moved from a small-scale LAN configuration at home or the like to an in-house LAN configuration in which many network compliant devices exist, it detects many devices in either of the cases of FIGS. 19A and 19B. This means that many device drivers are installed one after another. When the network compliant device is a multifunctional device functioning as a network scanner and network printer, drivers associated with the respective functions are installed. Further, when even one network printer deals with many PDLs (Page Description Languages), PDL count-dependent device drivers are installed. The number of installed device drivers cannot be ignored any more. The time taken to install one device driver is several ten sec to several min, and a long time is required until the user can perform intended work using the client terminal 100. In addition, the memory is consumed by unwanted device drivers, and trouble may occur in intended work.

The first embodiment solves this problem by setting, for each network configuration to which the client terminal 100 is connected, whether or not to transmit a device search request message (Probe) from the client terminal 100, and whether or not to respond to a network entry message (Hello) from a network compliant device.

The control flow of the client terminal 100 according to the first embodiment will be explained with reference to the flowchart of FIG. 2. This process is performed by a memory-resident PnP mode setting utility (application program) installed in the client terminal.

The PnP mode setting utility 7 resident in the memory of the client terminal 100 starts network connection via any one of the Ethernet, Wi-Fi, and Bluetooth communication controllers. At this time, the PnP mode setting utility 7 waits until it is notified of Notify from the network manager 9 (step S1). Reception of this notification triggers the PnP mode setting utility 7 to acquire, via the network manager 9, information representing which of the Ethernet, Wi-Fi, and Bluetooth controllers is a network controller in operation (step S2).

The PnP mode setting utility 7 acquires the following network setting information from the TCP/UDP/IP protocol stack 4 (step 53).

DHCP Enabled: YES/NO (meaning whether or not to acquire an address by DHCP)
IP Address: IP address (local IP address)
Subnet Mask: subnet mask value
Default Gateway Gateway address
DNS Server: DNS server address
DHCP Server: DHCP server address The PnP mode setting utility 7 searches via the memory controller 10 for a PnP setting data file which was recorded in the memory (hard disk) (step S4). In order to facilitate the search process, the PnP setting data file has a specific extension or is stored in a specific folder.

The PnP mode setting utility 7 determines whether there is a PnP setting data file which matches setting information of the currently connected network (step S5). If the client terminal 100 is connected to a network to which the client terminal 100 has not been connected even once before, no corresponding PnP setting data exists, and the PnP mode setting utility 7 determines a mismatch.

FIG. 3 shows an example of the format of PnP setting data (file) to be recorded. As shown in FIG. 3, the PnP setting data describes, in XML (eXtensible Markup Language), network information, setting information representing whether to permit/inhibit issuing of PnP setting data "Probe" to the network configuration, and setting information representing whether to permit/inhibit a response to a Hello message. When a description sandwiched between tags <DHCPEnabled> and </DHCPEnabled> is "YES", no line of tags <IPAddress> and </IPAddress> exists. This is because the local IP address of the client terminal 100 may change every connection in the use of DHCP.

In the PnP setting data file of FIG. 3, tags <Probe> and </Probe> describe whether or not to multicast a device search request message (Probe) from the client terminal 100. Tabs <Hello> and </Hello> describe whether or not to respond to a network entry message (Hello) issued by a network device.

FIG. 18 is a flowchart showing comparison procedures with a PnP setting data file which has already been stored.

The PnP mode setting utility 7 sequentially reads PnP setting data files via the memory controller 10 (step S100). In step S101, the PnP mode setting utility 7 determines whether data to be read exists and has normally been read.

After the PnP mode setting utility 7 reads data, the flow advances to step S102, and the PnP mode setting utility 7 determines whether the description between tags <DHCPEnabled> and </DHCPEnabled> of the read data is YES or NO. That is, the PnP mode setting utility 7 determines whether the use of DHCP is set in the network communication configuration of the read data.

If the PnP mode setting utility 7 determines that the use of DHCP is described, the flow advances to step S104, and the PnP mode setting utility 7 determines whether the network controller currently connected to the network is set as a DHCP client. That is, the PnP mode setting utility 7 determines whether the description associated with DHCP in the read data matches the DHCP state of the currently connected network. If NO in step S104, the read PnP setting data file does not match the current network communication configuration. Thus, the flow returns to step S100, and the PnP mode setting utility 7 reads the next PnP setting data file.

If the PnP mode setting utility 7 determines in step S104 that the description associated with DHCP in the read PnP setting data file matches the current network communication configuration, the flow advances to step S105. In step S105, the PnP mode setting utility 7 determines whether the IP addresses of a DNS server and Default Gateway in the read PnP setting data file match corresponding IP addresses in the current network communication configuration. If the IP addresses in the read PnP setting data file do not match those in the current network communication configuration, the flow returns to step S100; if the IP addresses match them, the flow advances to step S106.

In step S106, the PnP mode setting utility 7 determines whether Subnet Mask information in the read PnP setting data file matches Subnet Mask in the current network communication configuration. If NO in step S106, the flow returns to step S100. If YES in step S106, the flow advances to step S107, and the PnP mode setting utility 7 determines that there is a PnP setting data file which describes the same information as that of the currently connected network configuration. Then, the process ends.

If the description associated with DHCP in the read PnP setting data file is "NO" in step S102, the flow advances to step S103. In step S103, the PnP mode setting utility 7 determines whether an IP address described in a tag IPAddress in the read PnP setting data file matches an IP address set for the currently connected network controller. If these IP addresses do not match each other, the flow returns to step S100; if they match each other, the flow advances to step S105.

In this manner, the flow returns to step S100 to repeat the above process. If the PnP mode setting utility 7 cannot find a PnP setting data file which matches the currently connected network configuration, the flow advances from step S101 to step S108, and the PnP mode setting utility 7 determines that no matched data file exists. Then, the process ends.

Figure 2:
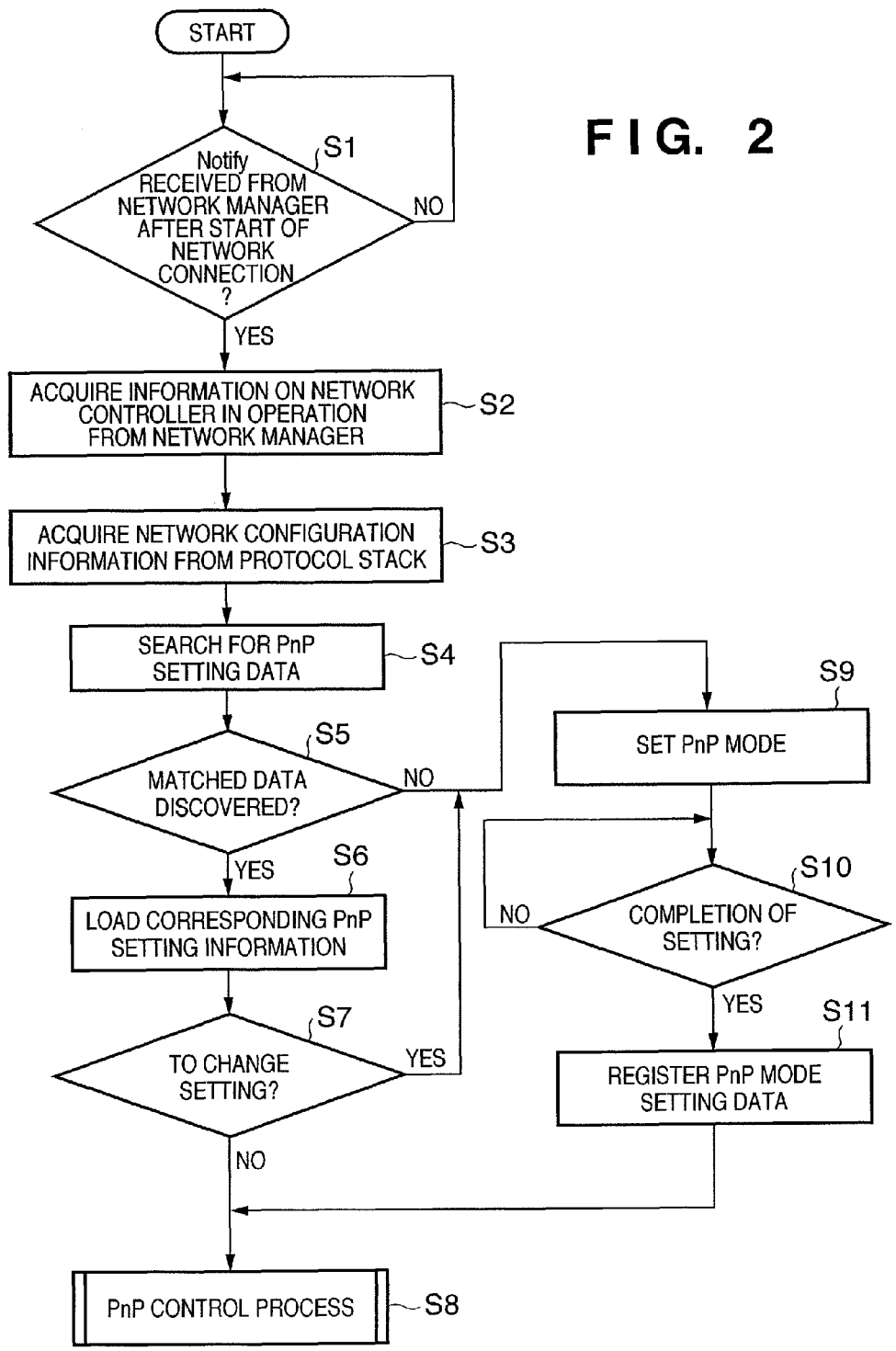
FIG. 2 is a flowchart showing procedures to acquire and set PnP mode information in the embodiment.

Referring back to the description of the flowchart in FIG. 2, if the PnP mode setting utility 7 determines in step S5 that there is a PnP setting data file which describes the same configuration as that of the currently connected network configuration, the flow advances to step S6. In step S6, the PnP mode setting utility 7 loads the PnP setting data file, and displays a pop-up menu shown in FIG. 4 in order to prompt the user of the client terminal 100 to select whether to change the description contents of the PnP setting data file. In step S7, the PnP mode setting utility 7 determines whether the user selects to change or not to change the description contents.

FIG. 4 shows a state in which the user selects to search a connected network communication configuration for a network device (permit transmission of a Probe message) and not to respond to an entry message (Hello) from a network device.

In order to select, from the displayed pop-up menu, whether or not to change the description contents of the PnP setting data file, the user designates either the Yes or No button shown in FIG. 4 with a pointing device.

If the PnP mode setting utility 7 determines that the user selects not to change the description contents, i.e., designates the No button in FIG. 4, the flow advances from step S7 to step S8, and the PnP mode setting utility 7 executes a PnP control process in accordance with the description of the loaded PnP setting data file.

If a PnP setting data file which matches the currently connected network configuration does not exist in step S5, or the user inputs in step S7 an instruction to change the description contents of the PnP setting data file, the flow advances to step S9. In step S9, the PnP mode setting utility 7 displays a pop-up menu in FIG. 5 to prompt the user to set a PnP mode for the currently connected network configuration.

This pop-up menu displays the type of network to which the client terminal 100 is currently connected, and part of network information. The user can set whether to permit/inhibit the network device search function and whether to permit/inhibit a response to a Hello message.

In step S10, the PnP mode setting utility 7 determines whether the setting is complete. If the user designates the OK button in the window of FIG. 5 with the pointing device, the PnP mode setting utility 7 determines that the setting is complete. In this case, the flow advances to step S10, and the PnP mode setting utility 7 registers the setting information in the format shown in FIG. 3 in the memory via the memory controller 10, and executes PnP control on the basis of the setting information (step S8).

If the flow advances from step S5 to step S9, a new PnP setting data file is saved. If the flow advances from step S7 to step S9, an existing PnP setting data file is changed and saved again.

Figure 6:
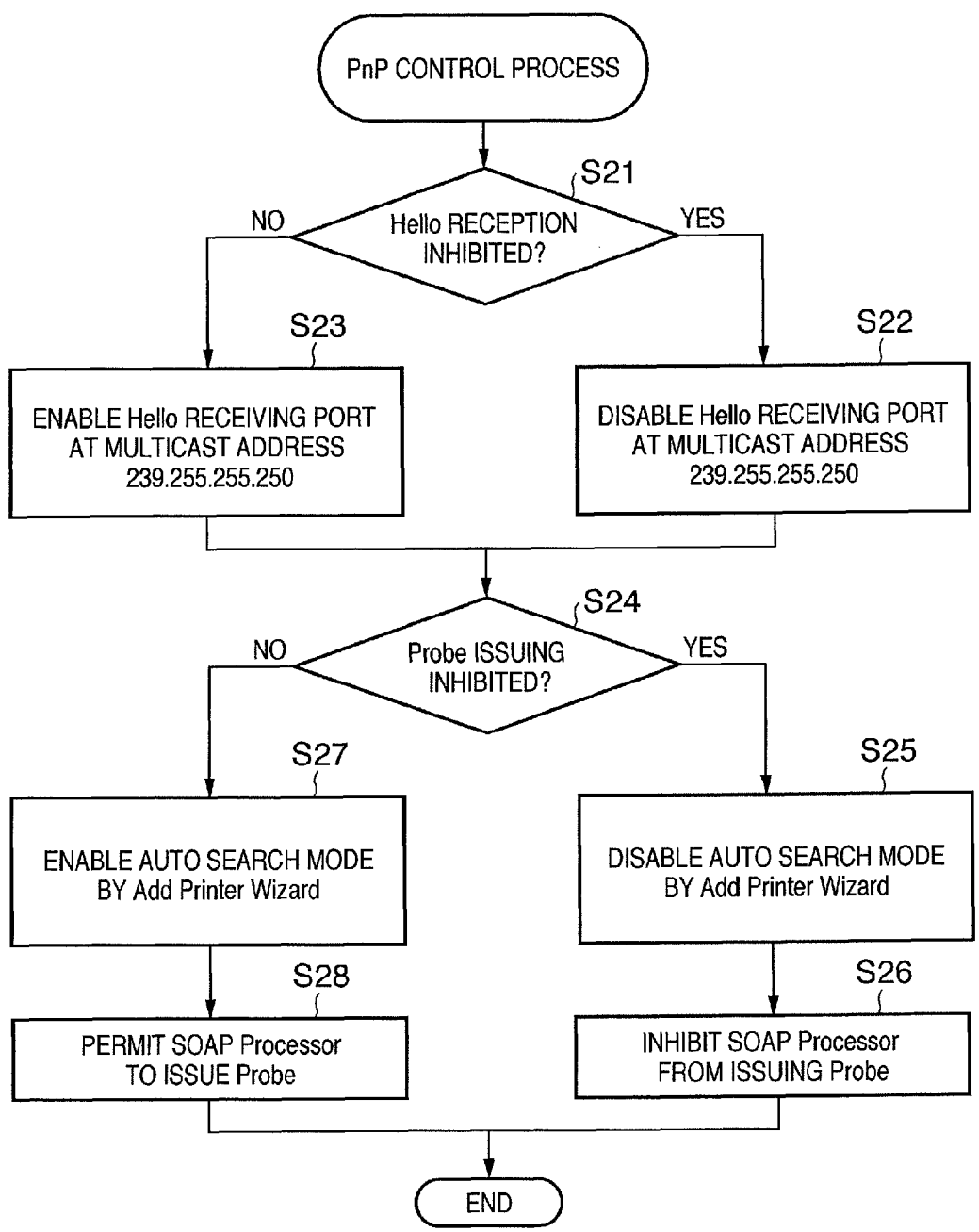
FIG. 6 is a flowchart showing the process contents of search for a network device and a response to a Hello message in accordance with the PnP mode setting in the embodiment.

FIG. 6 is a flowchart for explaining a concrete means for permitting/inhibiting the network device search function and permitting/inhibiting a response to a Hello message in accordance with the PnP mode setting.

On the basis of PnP mode setting for a currently connected network, the PnP mode setting utility 7 determines whether the setting is to inhibit a Hello response (step S21). If the PnP mode setting utility 7 determines that a Hello response is inhibited, the PnP mode setting utility 7 notifies the TCP/UDP/IP protocol stack 4 to disable the multicast port (239.255.255.250) (step S22). The TCP/UDP/IP protocol stack 4 disables the port. As a result, the utility 14, the application 15, and modules on upper layers above the TCP/UDP/IP protocol stack 4 are not notified of a Hello message sent from a network device. That is, even if a device on the network issues a Hello message, no upper layer is notified of the Hello message, inhibiting installation of the device driver of the device.

If the PnP mode setting utility 7 determines that a Hello response is permitted, the flow advances to step S23, and the PnP mode setting utility 7 notifies the TCP/UDP/IP protocol stack 4 to enable the multicast port (239.255.255.250). The TCP/UDP/IP protocol stack 4 enables the port. Resultantly, the utility 14, the application 15, and modules on upper layers above the TCP/UDP/IP protocol stack 4 are notified of a Hello message sent from a network device.

Then, the flow advances to step S24. In step S24, the PnP mode setting utility 7 determines whether inhibition of Probe issuing is set. If inhibition of Probe issuing is set, the flow advances to step S25, and the PnP mode setting utility 7 notifies the utility 14 and application 15 having the network device search function such as Add Printer Wizard to disable the function. The PnP mode setting utility 7 notifies the SOAP processor 6 to inhibit generation of a Probe packet (step S26). When a module on an upper layer, the utility 14, or the application 15 requests the SOAP processor 6 to issue a Probe packet, the SOAP processor 6 notifies the module, utility 14, or application 15 of an error. Therefore, the client terminal 100 does not issue any network device search message (Probe) to the network.

If permission of Probe issuing is set, the flow advances to step S27, and the PnP mode setting utility 7 notifies the utility 14 and application 15 having the network device search function such as Add Printer Wizard to enable the function. At the same time, the PnP mode setting utility 7 notifies the SOAP processor 6 to permit generation of a Probe packet (step S28). When a module on an upper layer, the utility 14, or the application 15 requests the SOAP processor 6 to issue a Probe packet, the SOAP processor 6 generates a Probe packet defined by the WS-Discovery specifications. The SOAP processor 6 transmits the generated Probe packet onto the network via the TCP/UDP/IP controller 4.

Upon completion of control for PnP mode setting, the client terminal 100 executes a PnP process for a network device.

Figure 7:
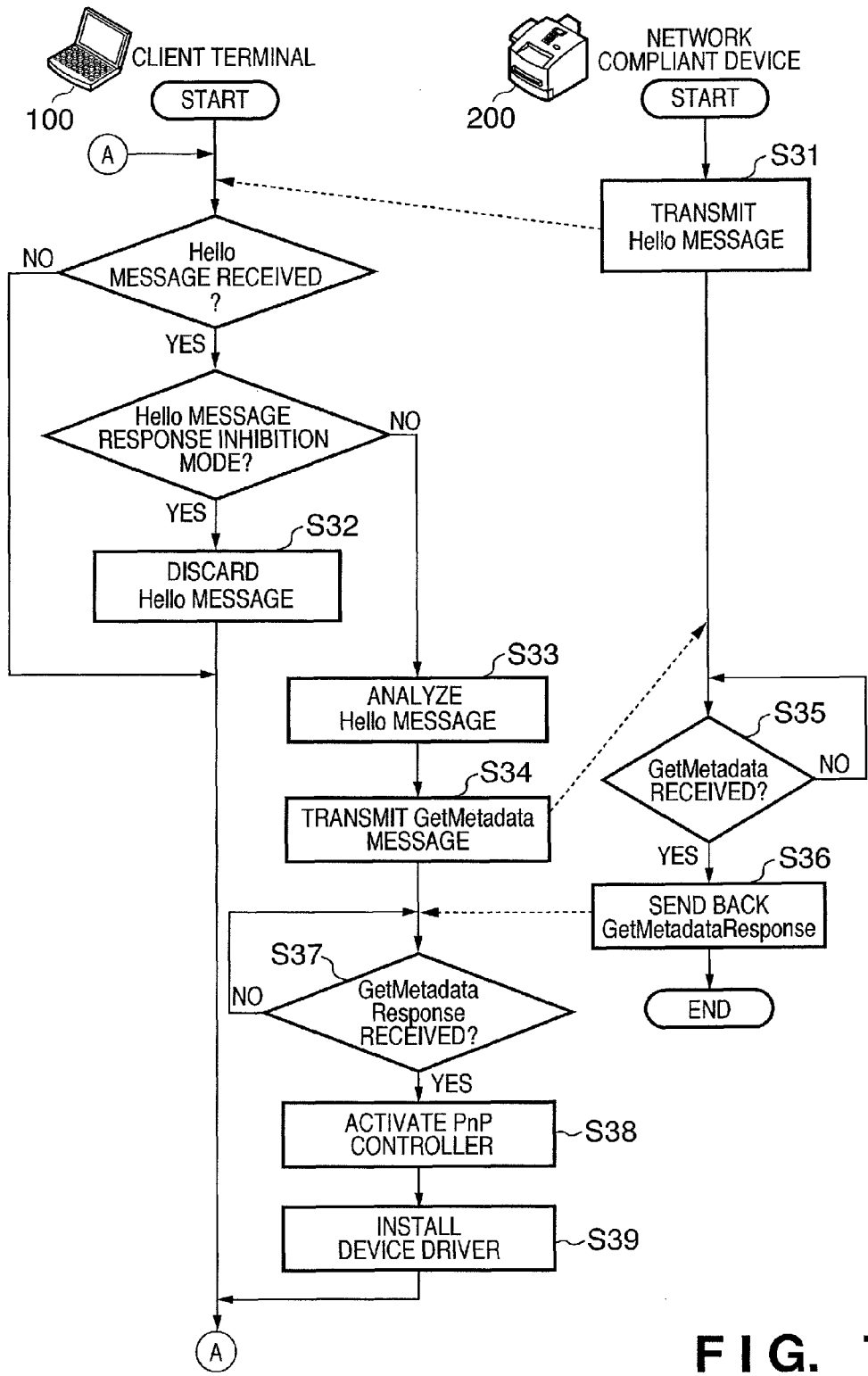
FIG. 7 is a flowchart showing the flow of a PnP process between a client terminal and a network device in the embodiment.

An example of issuing a Hello message when a network compliant device enters a network will be explained with reference to the flowchart of FIG. 7.

In the first embodiment, the network compliant device 200 is newly introduced into a network and starts communication on the network, or is turned on from the OFF state and resumes communication on the network. At this time, the WSD module 21 requests the SOAP processor 20 to transmit a Hello message. The SOAP processor 20 generates a Hello message on the basis of the WS-Discovery specifications, and multicasts the Hello message to a multicast address 239.255.255.250 via the protocol stack (step S31).

The Hello message is described in XML-SOAP. FIG. 8 shows an example of the format of the Hello message.

The client terminal 100 sets the PnP mode so as to inhibit a response to a Hello message. In this case, since the TCP/UDP/IP protocol stack 4 disables the multicast port 239.255.255.250, it discards a Hello message transmitted from the network device 200 (step S32). That is, the TCP/UDP/IP protocol stack 4 blocks notification of the received Hello message to the SOAP processor of the OS.

Even if a new network compliant device starts operating on the network, the application 15, utility 14, and WSD module 8 on upper layers above the TCP/UDP/IP protocol stack 4 do not acquire any operation start information of the network compliant device 200. Hence, for example, a utility for installing a network device is not activated, or a message which announces the discovery of a new device is not displayed on the display.

If permission of a Hello response is set, the SOAP processor 6 is notified of a Hello message via the TCP/UDP/IP protocol stack 4. The SOAP processor 6 analyzes the contents of the Hello message, and notifies the WSD module 8 of the analysis result (step S33).

On the basis of an address described in the Hello message, the WSD module 8 specifies a network device which has issued the message. The WSD module 8 requests the SOAP processor 6 to issue a GetMetadata message defined by WS-MetadataExchange in order to acquire attribute information of the specified network device.

The SOAP processor 6 generates a GetMetadata message on the basis of the WS-MetadataExchange specifications. The SOAP processor 6 unicasts the generated message to the network compliant device 200 via the TCP/UDP/IP protocol stack 4 (step S34).

The GetMetadata message is described in XML-SOAP. FIG. 9 shows an example of the message format of the GetMetadata message.

Upon reception of the GetMetadata message, the network compliant device 200 notifies the SOAP processor 20 of it via the TCP/UDP/IP protocol stack 18 (step S35). The SOAP processor 20 analyzes the contents of the GetMetadata message, and notifies the WSD module 21 of the analysis result. In order to send back the designated attribute information to the client, the WSD module 21 requests the SOAP processor 20 to issue a GetMetadataResponse message defined by WS-MetadataExchange.

The SOAP processor 20 generates a GetMetadataResponse message on the basis of the WS-MetadataExchange specifications, and unicasts the GetMetadataResponse message to the client terminal 100 via the protocol stack (step S36).

The GetMetadataResponse message is described in XML-SOAP. FIG. 10 shows an example of the format of the GetMetadataResponse message.

If the client terminal 100 receives the GetMetadataResponse message, it notifies the SOAP processor 6 of the received message via the TCP/UDP/IP protocol stack 4 (step S37).

The WSD module 8 is notified of the device attribute information described in the GetMetadataResponse message via the SOAP processor 6 of the client terminal 100.

The WSD module 8 activates the PnP controller 11 (step S38), and notifies it of the device attribute information. Upon reception of the notification, the PnP controller 11 searches its storage device via the memory controller for a driver corresponding to the device attribute information, and installs the driver in the OS (step S39).

Figure 11:
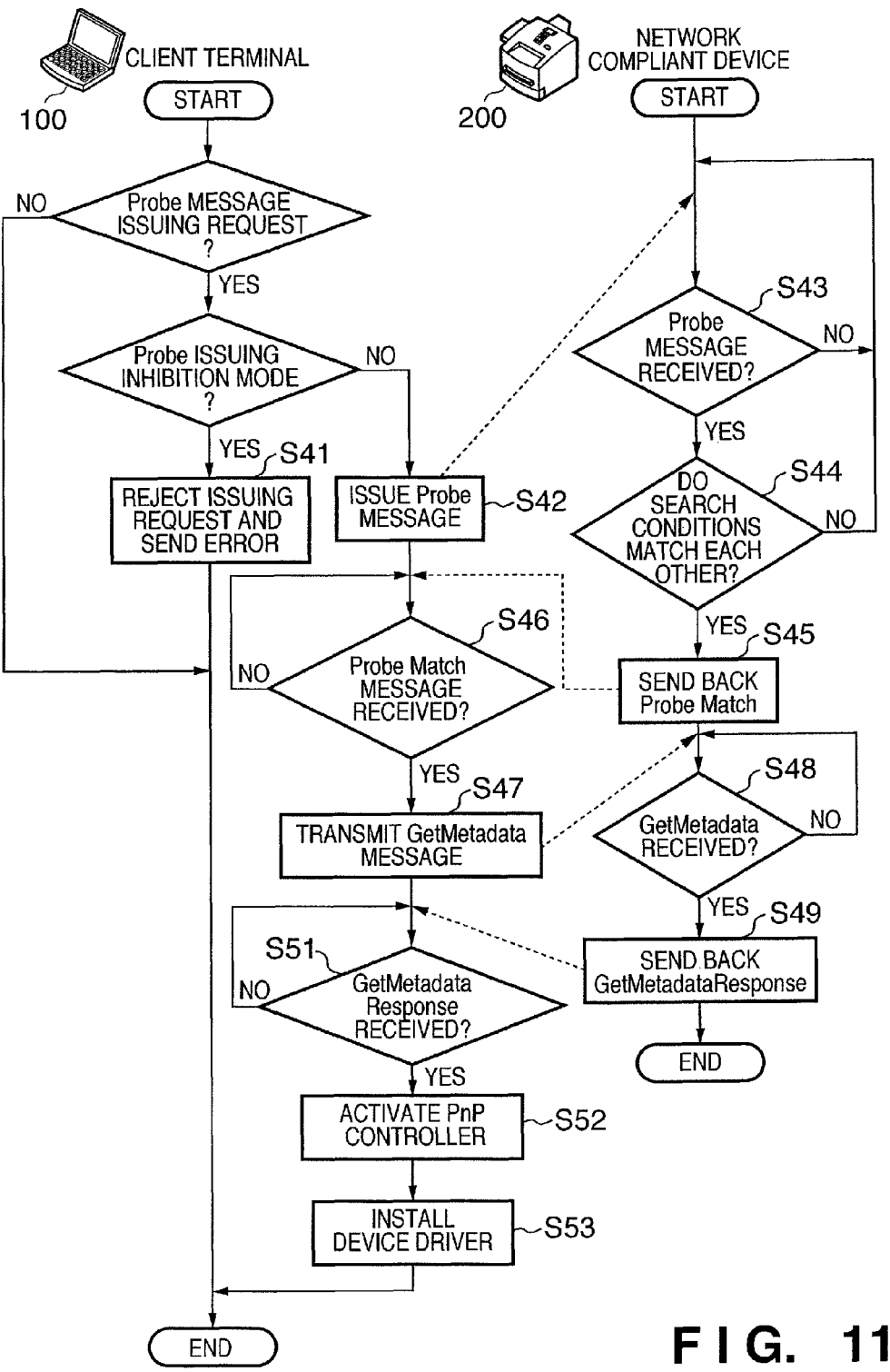
FIG. 11 is a flowchart showing the flow of a PnP process between the client terminal and the network device in the embodiment.

A network compliant device search process by the client terminal 100 will be briefly explained with reference to the flowchart of FIG. 11.

In general, when the utility 14 or application 15 in the client terminal 100 requests the SOAP processor 6 to transmit a Probe message defined by the WS-Discovery specifications, the SOAP processor 6 generates a Probe message on the basis of the WS-Discovery specification. The SOAP processor 6 multicasts the generated Probe message to the multicast address 239.255.255.250 via the protocol stack. The SOAP processor 6 implements the search process depending on whether a Probe Match message serving as response to the Probe message from the network compliant device 200 is received.

When the PnP mode is set to inhibit Probe issuing (steps S25 and S26 in FIG. 6), the corresponding functions of the utility 14 and application 15 are disabled. In this case, the utility 14 and application 15 do not notify the SOAP processor 6 of any Probe message issuing request.

As described above, the PnP mode setting utility 7 notifies the SOAP processor 6 to inhibit generation of a Probe packet. Thus, even if an application or a module on an upper layer requests the SOAP processor 6 to issue a Probe packet, the SOAP processor 6 notifies the application or module of an error (step S41). The client terminal 100 does not issue a Probe message to search the network for a network device. Hence, the device driver of a network compliant device is not installed.

To the contrary, when the PnP mode is set to permit Probe issuing, the SOAP processor 6 multicasts a Probe message defined by the WS-Discovery specifications to the multicast address 239.255.255.250 via the TCP/UDP/IP protocol stack 4 (step S42).

The Probe message is described in XML-SOAP. FIG. 12 shows an example of the message format of the Probe message.

If the network compliant device 200 receives the Probe message (step S43), it notifies the SOAP processor 20 of the received Probe message via the TCP/UDP/IP protocol stack 16. The SOAP processor 20 analyzes the contents of the Probe message, and notifies the WSD module 21 of the analysis result. The WSD module 21 determines whether the notified message contents match a function provided by the network compliant device 200 (step S44). If the WSD module 21 determines that the notified message contents do not match the function, it ignores the information. In this case, the network compliant device 200 does not issue any Probe response.

If the WSD module 21 determines that the notified message contents match the function, it requests the SOAP processor 20 to issue a Probe Match message.

The SOAP processor 20 generates a Probe Match message on the basis of the WS-Discovery specifications, and unicasts the Probe Match message to the client terminal 100 via the protocol stack (step S45).

The Probe Match message is described in XML-SOAP. FIG. 13 shows an example of the message format of the Probe Match message.

The client terminal 100 receives the Probe Match message (step S46), and notifies the SOAP processor 6 of the Probe Match message via the TCP/UDP/IP protocol stack 4. The SOAP processor 6 analyzes the contents of the Probe Match message, and notifies the WSD module 8 of the analysis result.

On the basis of an address described in the Probe Match message, the WSD module 8 specifies the network compliant device 200 which has issued the message. The WSD module 8 requests the SOAP processor 6 to issue a GetMetadata message defined by WS-MetadataExchange in order to acquire attribute information of the network compliant device 200.

The SOAP processor 6 generates a GetMetadata message on the basis of the WS-MetadataExchange specifications. The SOAP processor 6 unicasts the generated message to the network compliant device 200 via the protocol stack (step S47).

The GetMetadata message is described in XML-SOAP, as shown in FIG. 9.

The network compliant device 200 receives the GetMetadata message, and notifies the SOAP processor 20 of the GetMetadata message via the TCP/UDP/IP protocol stack 18 (step S48). The SOAP processor 20 analyzes the contents of the GetMetadata message, and notifies the WSD module 21 of the analysis result. In order to send back the designated attribute information to the client, the WSD module 21 requests the SOAP processor 20 to issue a GetMetadataResponse message defined by WS-MetadataExchange.

The SOAP processor 20 generates a GetMetadataResponse message on the basis of the WS-MetadataExchange specifications, and unicasts the GetMetadataResponse message to the client terminal 100 via the protocol stack (step S49).

The GetMetadataResponse message is described in XML-SOAP. The description format of the GetMetadataResponse message has already been described with reference to FIG. 10.

If the client terminal 100 receives the GetMetadataResponse message (step S51), it notifies the SOAP processor 6 of the received message via the TCP/UDP/IP protocol stack 4.

The WSD module 8 is notified of the device attribute information described in the GetMetadataResponse message via the SOAP processor 6 of the client terminal 100. The WSD module 8 activates the PnP controller 11 (step S52), and notifies it of the device attribute information. Upon reception of the notification, the PnP controller 11 searches the storage device such as a hard disk via the memory controller for a driver corresponding to the device attribute information, and installs the corresponding driver (step S53).

By executing the above-described steps, the client terminal 100 can individually set PnP modes for different network configurations, and execute PnP suited to each network configuration. The client terminal 100 can prevent unconditional installation of the device driver of a network compliant device particularly upon connection to an unknown network. The user can quickly perform work using the portable terminal, and the limited memory of the mobile device can also be effectively utilized.

In the first embodiment the pop-up menu for confirming whether to change setting information is displayed when the network to which the client terminal 100 is connected is one to which the client terminal 100 has connected before (YES in step S5 of FIG. 2). However, a process complying with a PnP setting data file may be directly performed without displaying the pop-up menu. In this case, however, no PnP setting data file can be edited, so a utility application separately allows editing the PnP setting data file.

In the first embodiment, PnP setting data files are created by the number of networks to which the client terminal 100 has connected before. These PnP setting data files may be managed by one file. When the PnP setting data files are managed by one file, the data structure has a binary format as shown in FIG. 20. FIG. 20 shows a state in which the client terminal 100 has connected to three networks before. Note that " . . . " in FIG. 20 represents that the data item is not contained in the network determination condition.

<Second Embodiment>

In the first embodiment, the PnP setting data file describes parameters associated with network communication. The second embodiment will explain an example of setting whether to permit/inhibit issuing of a Probe message and whether to permit/inhibit a response to a Hello message in accordance with the type of communication controller for use (in the second embodiment, three, Ethernet, Wi-Fi, and Bluetooth controllers).

Figure 14:
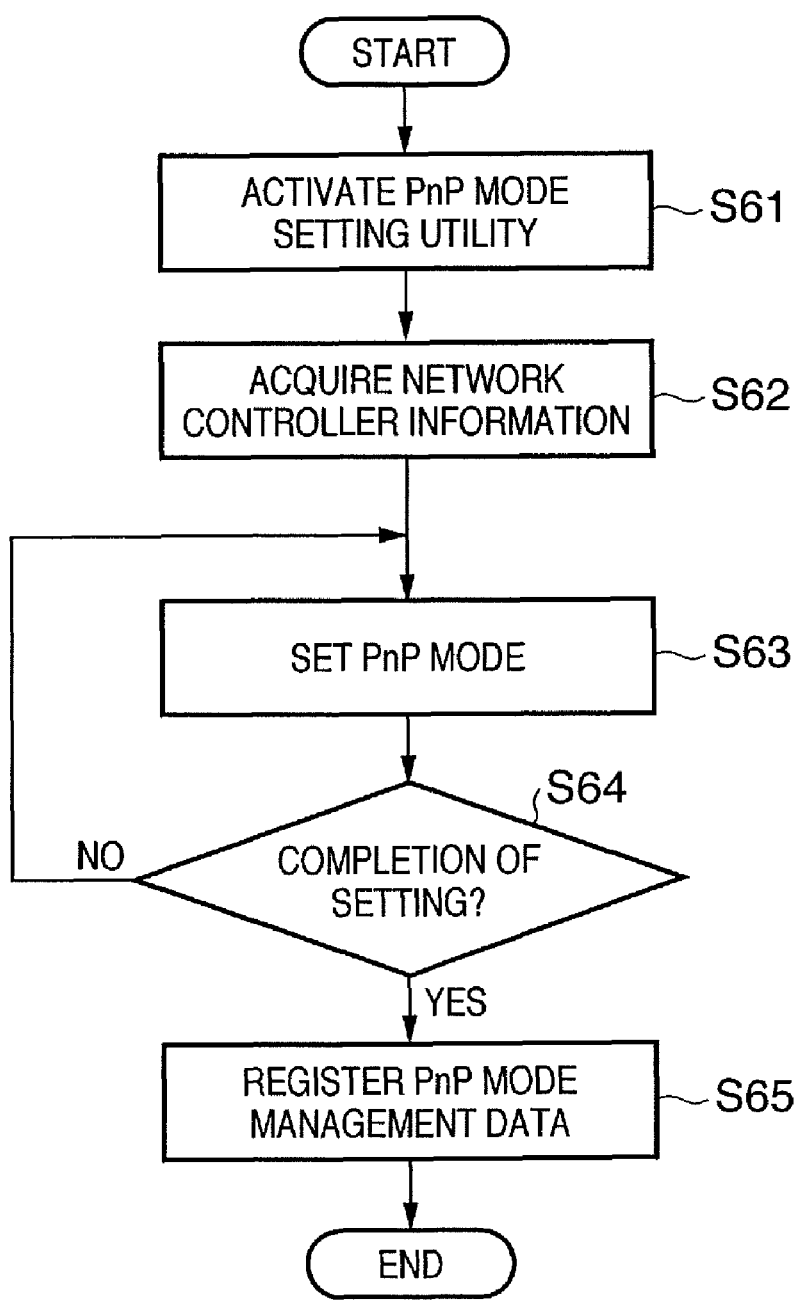
FIG. 14 is a flowchart showing procedures to set a network PnP mode for each network controller type in the second embodiment.

FIG. 14 is a flowchart showing procedures to set a network PnP mode for each network controller in the second embodiment.

A PnP mode setting utility 7 is activated (step S61), and acquires information on currently available network controllers from a network manager 9 (step S62).

FIG. 15 shows the user interface of the PnP mode setting utility 7 in the second embodiment. Information acquired from the network manager is displayed in a pull-down menu at a designation item "please designate a network." In the second embodiment, the user can select one of Ethernet, Wi-Fi, and Bluetooth. For a selected network connection, the user can set whether to permit/inhibit a function of searching for a network compliant device 200 and whether to permit/inhibit a response to a Hello message. In FIG. 15, the user can select permission or inhibition of either setting from the pull-down menu for any setting (step S63).

If the user designates the OK button with a pointing device, the PnP mode setting utility 7 determines that the setting is complete (step S64), and records the setting information in a format shown in FIG. 16 in a memory such as a hard disk (step S65).

The user can make the setting even if a client terminal 100 is not connected to any network. That is, the user of the client terminal 100 can set a PnP mode in advance when, for example, he knows in advance that he will bring the client terminal 100 from a currently used network configuration and use the client terminal 100 on a network in an office at the visit.

Figure 17:
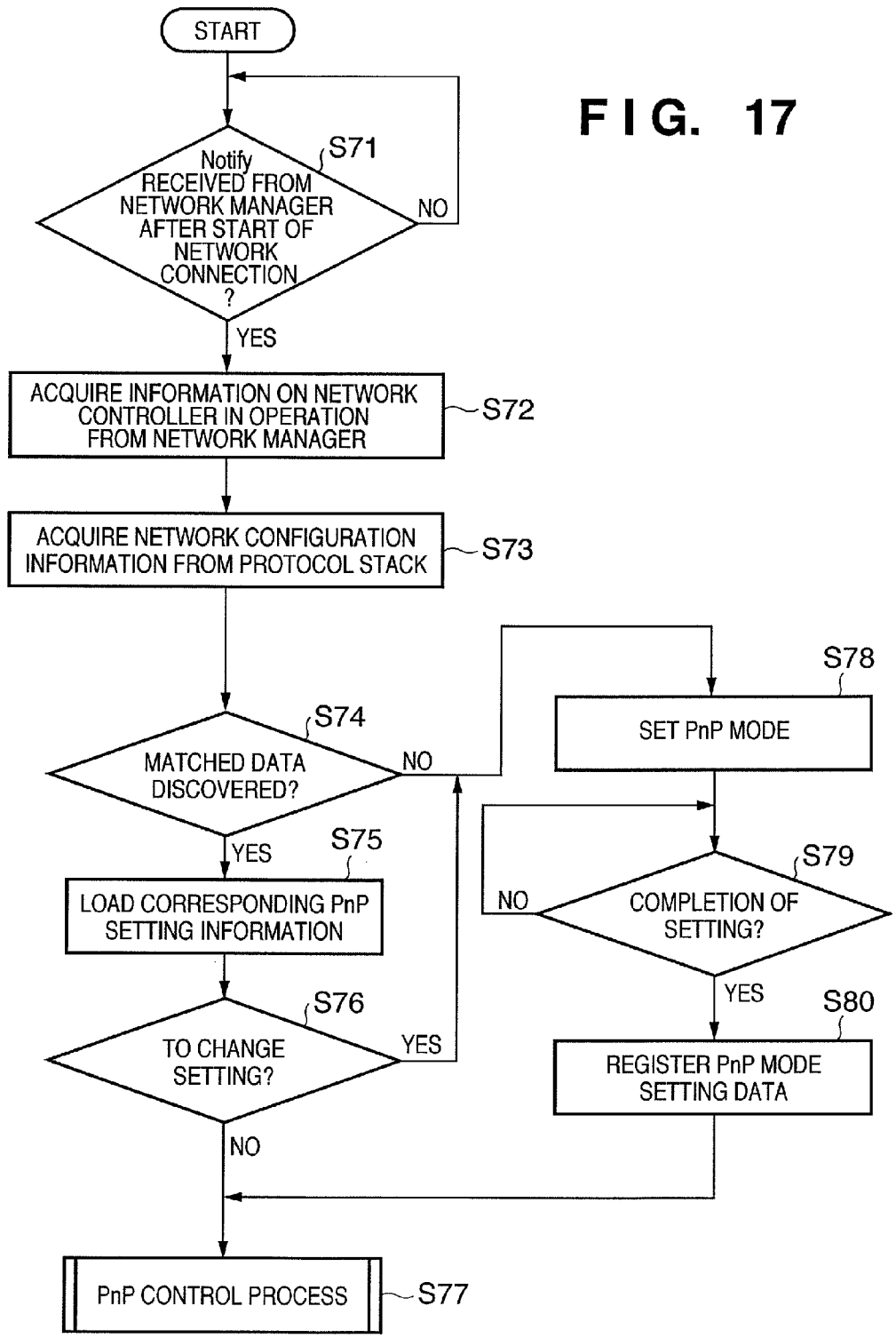
FIG. 17 is a flowchart showing procedures to acquire and set PnP mode information in the second embodiment.

FIG. 17 is a flowchart showing process procedures by the PnP mode setting utility 7 when the client terminal 100 is connected to a network.

When the client terminal 100 starts network connection via one of Ethernet, Wi-Fi, and Bluetooth communication media, the network manager 9 notifies the PnP mode setting utility 7 of Notify (step S71). This notification triggers the PnP mode setting utility 7 to acquire, via the network manager 9, information representing which of the Ethernet, Wi-Fi, and Bluetooth controllers is a network controller in operation (step S72).

The PnP mode setting utility 7 searches for PnP setting data recorded in the memory via a memory controller 10, and compares the detected PnP setting data with the acquired data (step S73). The PnP mode setting utility 7 determines whether PnP setting data which describes the network-connected network controller in operation has been discovered (step S74).

If the PnP setting data has been discovered, the flow advances to step S75, and the PnP mode setting utility 7 loads the PnP setting information and displays it in the pop-up menu, as shown in FIG. 4. That is, the PnP mode setting utility 7 prompts the user to determine whether to change the setting. If the user designates the No button with the pointing device, the PnP mode setting utility 7 executes PnP control in accordance with the loaded PnP setting data (step S77).

If the user designates the Yes button in the menu of FIG. 4, i.e., inputs an instruction to change the PnP setting, the flow advances to step S78. The flow also advances to step S78 when PnP setting data which describes the type of currently network-connected network controller does not exist in step S74, i.e., the network configuration is one, the use of which is not assumed in advance, and no PnP setting is executed. In step S78, the PnP mode setting utility 7 displays the pop-up menu shown in FIG. 5 to prompt the user to set a PnP mode for the network configuration.

The pop-up menu displays the type of network to which the client terminal 100 is currently connected, and part of network information. The user can set, from the pop-up menu, whether to permit/inhibit the function of searching for the network compliant device 200 and whether to permit/inhibit a response to a Hello message.

If the user designates the OK button in the menu of FIG. 5, the PnP mode setting utility 7 determines that the setting is complete (step S79), and saves the setting information in the memory (e.g., hard disk) in the above-mentioned format shown in FIG. 16 (step S80). Note that the save process in step S80 is a re-save process when the flow advances from step S76 to step S78, and a new save process when the flow advances from step S74 to step S78. After that, the PnP mode setting utility 7 executes PnP control in accordance with the setting information (step S77).

A concrete process to permit/inhibit the process to search for the network compliant device 200 and permit/inhibit a response to a Hello message on the basis of the setting is the same as that described in the first embodiment, and a description thereof will be omitted.

<Third Embodiment>

In the first embodiment, whether to permit/inhibit Probe issuing and whether to enable/disable a response to a Hello message are determined on the basis of the network configuration such as the local IP address, the subnet mask, the IP addresses of the DNS server and DHCP server, and whether to use DHCP in the network communication configuration. In the second embodiment, the type of network controller is determined as a network configuration.

Whether to permit/inhibit Probe issuing and whether to enable/disable a response to a Hello message may also be determined on the basis of the type of network controller in addition to the local IP address, the subnet mask, the IP addresses of the DNS server and DHCP server, and whether to use DHCP in the network communication configuration.

<Other Embodiment>

The above-described embodiments adopt a protocol defined by WS-Discovery in order to search for a network device and issue a notification representing that a network device enters a network, but the present invention is not limited to this protocol. For example, the present invention can also be implemented using, e.g., SSDP (Simple Service Discovery Protocol) and GENA (General Event Notification Architecture) defined by UPnPv1. The network device search protocol is arbitrary as far as an address for acquiring attribute information of a network device is utilized and a control information transmission destination for controlling a network device can be acquired. Hence, the present invention is not limited to the above embodiments.

The above-described embodiments uses Ethernet, Wi-Fi (wireless communication IEEE802.1a/b/g), and Bluetooth as communication media. However, the present invention can also be applied to either a local I/O or network as far as the communication medium can discover a device and notify the partner that the device starts executing its function.

As an example of the PnP, the above embodiments have described installation of a driver corresponding to a discovered network device. However, the present invention can also be applied to a case where a utility, application, or the like necessary to utilize and control a network device is automatically installed in the client terminal 100.

The above embodiments have exemplified a printer as a network device, but the printer is merely an example. The present invention can also be applied to any device such as a scanner or a storage device as far as the device can be used and controlled via a communication medium.

In the above-described embodiments, the client terminal 100 holds, in the memory, a driver for controlling a network device. However, the present invention is not limited to the driver, and can also be applied to an application and utility software. Further, the present invention can also be applied to a case where the software is held in a network device or another server.

In the above-described embodiments, DHCP Enabled, IP Address, Subnet Mask, Default Gateway, DNS Server, and DHCP Server are used as information for identifying a network configuration. However, another information can also be used as far as the network configuration can be uniquely identified.

The process functions in the client terminal 100 and network compliant device 200 according to the above-described embodiments are implemented by reading out programs for implementing the process functions from the memory and executing them by the CPU (Central Processing Unit). However, the present invention is not limited to this, and all or some of the process functions may be implemented by dedicated hardware. The above-mentioned memory may be formed from a magnetooptical disk, a nonvolatile memory (e.g., flash memory), a read-only storage medium (e.g., CD-ROM), a volatile memory other than a RAM, or a computer readable/writable recording medium of a combination of them.

As described in the embodiments, the main feature of the present invention resides in an application program in the client terminal 100. In general, an application program is stored in a computer readable storage medium such as a CD-ROM. The functions can be executed by setting the computer readable storage medium in a computer loadable reading device (e.g., a CD-ROM driver) and copying or installing the program in the system. Hence, the computer readable storage medium apparently falls within the scope of the present invention.

As has been described above, according to the present invention, whether or not to automatically install the device driver of a discovered network device can be set in accordance with the network configuration of a connected network. This makes it possible to prevent wasteful consumption of the hardware resource (e.g., memory) of an information processing apparatus used by the user upon connection to a given network. This also makes it possible to prevent damage such as destruction or leakage of information by software which is not reliably in security.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252472, filed Aug. 31, 2005 which is hereby incorporated by reference herein in its entirety.

The invention claimed is:

1. An information processing apparatus which has network communication means, and which can detect a network device via the network communication means to automatically install a corresponding device driver, comprising:

setting means for setting one or more network configuration information, each of which includes specifying information specifying a network configuration and installation information indicating whether or not to automatically install the corresponding device driver, and for storing the set network configuration information in a memory, wherein in a case that the installation information in the network configuration information set by said setting means indicates that the corresponding device driver is installed automatically, the installation information further includes information indicating that the device driver is installed automatically by at least one of a first function which installs the device driver in response to a reception of a network entry message issued from a network device on a connected network, and a second function which installs the device driver by multicasting a network device search message to the connected network and detecting an acknowledge from a network device on the connected network to which the network device search message is multicasted;

first determination means for determining, when detecting a connection to a network by the network communication means, a network configuration of the connected network;

second determination means for determining which of the network configuration information stored in the memory includes specifying information corresponding to the network configuration determined by said first determination means;

display means for displaying the installation information included in the network configuration information determined by said second determination means, to inform a user of how the installation of a device driver will be performed and to permit the user to change the installation information; and control means for controlling, in order to execute a process according to the installation information displayed by said display means, to switch whether or not to automatically install a device driver corresponding to a network device on the connected network, wherein if the installation information indicates enabling of the first function and a network entry message is received from the network device on the connected network, said control means provides the network entry message to a upper layer process to execute the automatic installation of the device driver for the network device, wherein if the installation information indicates disabling of the first function and the network entry message is received from the network device on the connected network, said control means does not provide the network entry message to the upper layer process, so as not to execute the automatic installation of a device driver for the network device, wherein if the installation information indicates enabling of the second function, said control means permits multicasting the network device search message to the connected network; and wherein if the installation information indicates disabling of the second function, said control means inhibits multicasting the network device search message to the connected network.

2. The apparatus according to claim 1, wherein each network configuration information contains whether or not to use DHCP, an IP address of the network, a subnet mask, a default gateway address, a DNS server address, and a DHCP server address as the specifying information.

3. The apparatus according to claim 1, wherein each network configuration information contains a type of the network communication means as the specifying information.

4. The apparatus according to claim 1,
wherein if said second determination means cannot determine network configuration information stored in the memory including the specification information corresponding to the network configuration determined by said first determination means, said control means determines the connected network as a new network, and causes the display means to display a GUI for setting the installation information for the new network to create new network configuration information and stores the created new network configuration information into the memory.

5. The apparatus according to claim 1, further comprising:
editing means for editing the setting information set by said setting means.

6. The apparatus according to claim 1, wherein
automatic installation of the device driver corresponding to the network device uses network Plug and Play, and
wherein the network entry message includes a Hello message, and the network device search request information includes a Probe message.

7. A method of controlling an information processing apparatus which has network communication means, and which can detect a network device via the network communication means to automatically install a corresponding device driver, comprising the steps of:
a setting step of setting one or more network configuration information, each of which includes specifying information specifying a network configuration and installation information indicating whether or not to automatically install the corresponding device driver, and for storing the set network configuration information in a memory, wherein in a case that the installation information in the set network configuration information indicates that the corresponding device driver is installed automatically, the installation information further includes information indicating that the device driver is installed automatically by at least one of a first function which installs the device driver in response to a reception of a network entry message issued from a network device on a connected network, and a second function which installs the device driver by multicasting a network device search message to the connected network and detecting an acknowledge from a network device on the connected network to which the network device search message is multicasted;
a first determination step of determining, when detecting a connection to a network by the network communication means, a network configuration of the connected network;
a second determination step of determining which of the network configuration information stored in the memory includes specifying information corresponding to the determined network configuration determined by said first determination step;
a display step of displaying the installation information included in the network configuration information determined by said second determination step, to inform a user of how the installation of a device driver will be performed and to permit the user to change the installation information; and
a control step of controlling, in order to execute a process according to the displayed installation information, to switch whether or not to automatically install a device driver corresponding to a network device on the connected network,
wherein if the installation information indicates enabling of the first function and a network entry message is received from the network device on the connected network, said control step provides the network entry message to a upper layer process to execute the automatic installation of the device driver for the network device,
wherein if the installation information indicates disabling of the first function and the network entry message is received from the network device on the connected network, said control step does not provide the network entry message to the upper layer process, so as not to execute the automatic installation of a device driver for the network device,
wherein if the installation information indicates enabling of the second function, said control step permits multicasting the network device search message to the connected network; and
wherein if the installation information indicates disabling of the second function, said control step inhibits multicasting the network device search message to the connected network.

8. A non-transitory computer readable storage medium storing a program which is loaded and executed by a computer to cause the computer to function as an information processing apparatus which has network communication means, which can detect a network device via the network communication means to automatically install a corresponding device driver, and which includes:
setting means for setting one or more network configuration information, each of which includes specifying information specifying a network configuration and installation information indicating whether or not to automatically install the corresponding device driver, and for storing the set network configuration information in a memory, wherein in a case that the installation information in the network configuration information set by said setting means indicates that the corresponding device driver is installed automatically, the installation information further includes information indicating that the device driver is installed automatically by at least one of a first function which installs the device driver in response to a reception of a network entry message issued from a network device on a connected network, and a second function which installs the device driver by multicasting a network device search message to the connected network and detecting an acknowledge from a network device on the connected network to which the network device search message is multicasted;
first determination means for determining, when detecting a connection to a network by the network communication means, a network configuration of the connected network;
second determination means for determining which of the network configuration information stored in the memory includes specifying information corresponding to the network configuration determined by said first determination means;
display means for displaying the installation information included in the network configuration information determined by said second determination means, to inform a user of how the installation of a device driver will be performed and to permit the user to change the installation information; and control means for controlling, in order to execute a processing according to the installation information, to switch whether or not to automatically install a device driver corresponding to a network device on the connected network, wherein if the installation information indicates enabling of the first function and a network entry message is received from the network device on the connected network, said control means provides the network entry message to a upper layer process to execute the automatic installation of the device driver for the network device, wherein if the installation information indicates disabling of the first function and the network entry message is received from the network device on the connected network, said control means does not provide the network entry message to the upper layer process, so as not to execute the automatic installation of a device driver for the network device, wherein if the installation information indicates enabling of the second function, said control means permits multicasting the network device search message to the connected network; and wherein if the installation information indicates disabling of the second function, said control means inhibits multicasting the network device search message to the connected network.

* * * * *